(12) United States Patent
DeVoss, Jr.

(10) Patent No.: US 8,845,004 B2
(45) Date of Patent: Sep. 30, 2014

(54) VEHICLE ROOF CANOPY FOR WEATHER PROTECTION OF OCCUPANTS

(71) Applicant: Richard Arlen DeVoss, Jr., West End, NC (US)

(72) Inventor: Richard Arlen DeVoss, Jr., West End, NC (US)

( * ) Notice: Subject to any disclaimer, the term of this patent is extended or adjusted under 35 U.S.C. 154(b) by 0 days.

(21) Appl. No.: 14/032,605

(22) Filed: Sep. 20, 2013

(65) Prior Publication Data

US 2014/0084621 A1 Mar. 27, 2014

Related U.S. Application Data

(60) Provisional application No. 61/706,495, filed on Sep. 27, 2012.

(51) Int. Cl.
*B60J 11/00* (2006.01)
*B60J 11/06* (2006.01)
*B60J 1/20* (2006.01)

(52) U.S. Cl.
CPC ............... *B60J 11/00* (2013.01); *B60J 1/2011* (2013.01)
USPC ........................................................ 296/99.1

(58) Field of Classification Search
USPC .................................. 296/77.1, 79, 83, 99.1
See application file for complete search history.

(56) References Cited

U.S. PATENT DOCUMENTS

| | | | |
|---|---|---|---|
| 6,402,221 B1* | 6/2002 | Ogunjobi | 296/97.6 |
| 6,663,162 B1 | 12/2003 | Tyrer | |
| 7,147,263 B2* | 12/2006 | Schneidau et al. | 296/77.1 |
| 7,234,753 B2 | 6/2007 | Held et al. | |
| 7,431,377 B2 | 10/2008 | Tyrer | |
| 8,069,899 B2 | 12/2011 | Nation | |
| 8,479,865 B2 | 7/2013 | Jackson | |
| 2006/0049654 A1* | 3/2006 | Schneidau et al. | 296/77.1 |
| 2006/0219278 A1* | 10/2006 | Lohman | 135/16 |
| 2007/0246092 A1 | 10/2007 | Gerrie et al. | |
| 2011/0303371 A1* | 12/2011 | Harrison | 160/370.21 |

* cited by examiner

*Primary Examiner* — H Gutman
(74) *Attorney, Agent, or Firm* — Smith Moore Leatherwood LLP; Phillip P. McCann; John P. Zimmer

(57) ABSTRACT

An attachable vehicle roof canopy comprising: a weather protective canopy comprising a weather protective material comprising sun blocking material, a bottom edge, a top edge, two side edges, and four corners; a slide out rod means extending from the bottom edge to the top edge and beyond; at least one upper connecting means for connecting the attachable vehicle roof canopy to a vehicle roof of a tractor or a golf cart: and at least one lower connecting means for connecting the attachable vehicle roof canopy to a vehicle roof of a tractor or a golf cart; and a golf cart comprising the attachable vehicle roof canopy. The attachable vehicle roof canopy adds additional protection to the occupants of a vehicle such as a tractor or a golf cart from rain and sun.

19 Claims, 4 Drawing Sheets

VEHICLE ROOF CANOPY FOR WEATHER PROTECTION OF OCCUPANTS

CROSS-REFERENCE TO RELATED APPLICATION

This application claims the benefit of U.S. Provisional Application No. 61/706,495, filed Sep. 27, 2012.

BACKGROUND OF THE INVENTION

Many vehicles such as tractors and golf carts include a roof as part of the vehicle leaving the occupants open to the weather. In the case of golf carts, it is not uncommon for golfers to use a golf cart while playing a round of golf. In fact, many golf courses require that the players use a golf cart in order to increase the speed of play. In a typical arrangement, the golf cart has seating to accommodate for two players (a driver and a rider), a rear rack to carry two golf bags side-by-side and a rigid or fabric roof to protect the riders from both sun and rain. The roof of a golf cart does not offer adequate protection from weather elements including rain or sun. There are covers that go over the entire roof of the golf cart. They have side panels that come down over the sides of the cart.

Such covers are difficult to put on and take off and to store in the golf cart when not used When you get in or out of a golf cart with this cover you have to zip and unzip the side curtain. This makes it difficult to get in and out of a golf cart. They are expensive and take a lot of space to store.

Accordingly, it is an object of the present invention to provide a canopy cover attachable to a vehicle roof of a tractor or a golf cart wherein the canopy is easily deployed in sunny or inclement weather.

Another object of the present invention is to provide a canopy that is removed or retracted as easily as it is deployed.

BRIEF SUMMARY OF THE INVENTION

The present invention relates to a vehicle roof canopy which is removable or retractable over the sides of the vehicle such as tractor or golf cart. The present invention further relates to an attachable vehicle roof canopy comprising: a weather protective canopy comprising a weather protective material comprising sun blocking material, a bottom edge, a top edge, two side edges, and four corners; a slide out rod means extending from the bottom edge to the top edge of the attachable vehicle roof canopy and beyond; at least one upper connecting means for connecting the attachable vehicle roof canopy to the vehicle roof: and at least one lower connecting means for connecting the attachable vehicle roof canopy to the vehicle roof.

The present invention further relates to an attachable golf cart canopy comprising: a weather protective canopy comprising a weather protective material comprising sun blocking material, a bottom edge, a top edge, two side edges, and four corners; a slide out rod means extending from the bottom edge to the top edge of the attachable golf cart canopy and beyond; at least one upper connecting means for connecting the attachable golf cart canopy to the golf cart roof; and at least one lower connecting means for connecting the attachable golf cart roof canopy to the golf cart roof.

The present invention is further directed to a golf cart comprising the attachable golf cart canopy as set forth above.

Golfers would tend to use such attachable golf cart canopies because they are quick and easy to put on a golf cart or remove and such attachable golf cart canopies can be stored easily in most golf bags. The attachable golf cart canopy keeps the golfers drier including the cart seat when golfing in the rain and protected from the sun. It also keeps them cooler in very hot weather because it adds shade to the golf cart.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

The invention may take physical form in certain parts and arrangements of parts, a preferred embodiment of which will be described in detail in the specification and illustrated in accompanying drawings which form a part hereof and wherein.

DETAILED DESCRIPTION OF THE INVENTION

As stated above, the roof of vehicles such as tractors and golf carts do not offer adequate protection from rain or sun. The attachable vehicle roof canopy of the present invention solves the problem.

This invention is an improvement on what currently exists. The attachable vehicle roof canopy 10 can be attached and detached quickly from the roof supports of a tractor or a golf cart. Golfers would tend to use the attachable golf cart canopy 10, which fits into most golf bags. The attachable golf cart canopy 10 helps keep the golfer drier including the golf cart seat. And the attachable golf cart canopy 10 keeps the golfer cooler in very hot weather by adding shade to the golf cart. The attachable golf cart canopy 10 also helps the golf courses because more people may golf in hot or wet weather.

Figure 3:
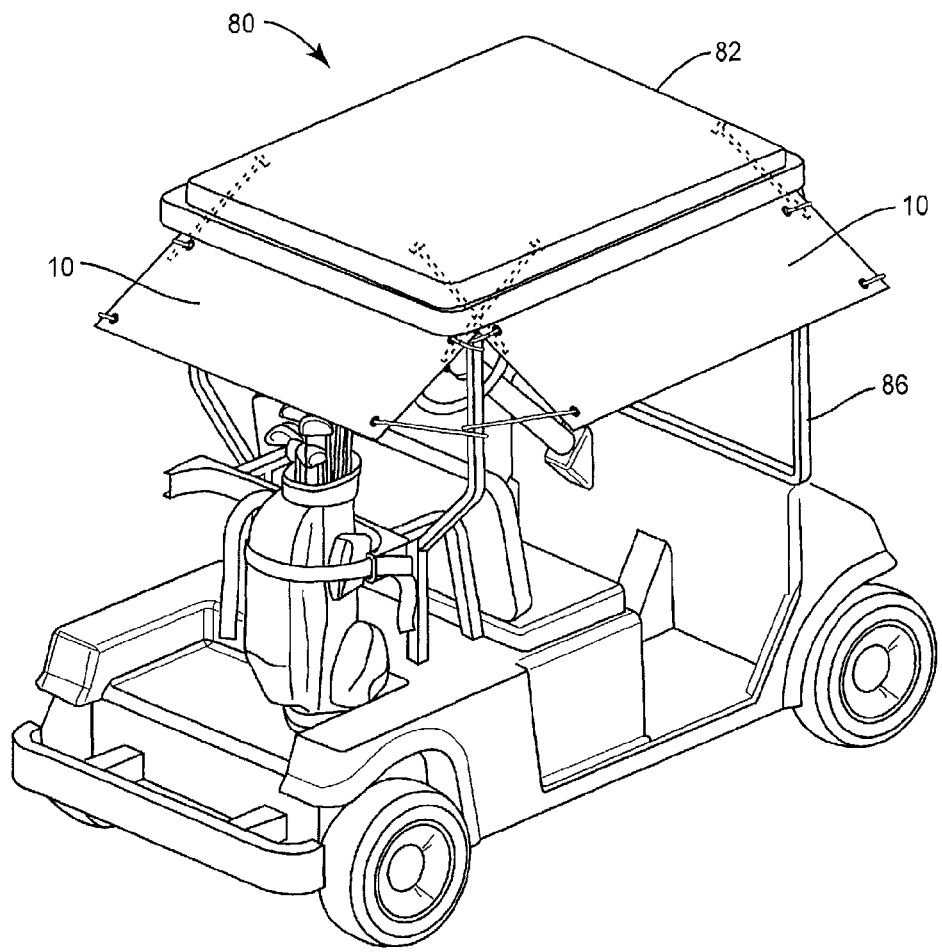
FIG. 3 perspective view of a rear view of a golf cart and the attachable golf cart canopy in accordance with an embodiment of the present invention.
Figure 4:
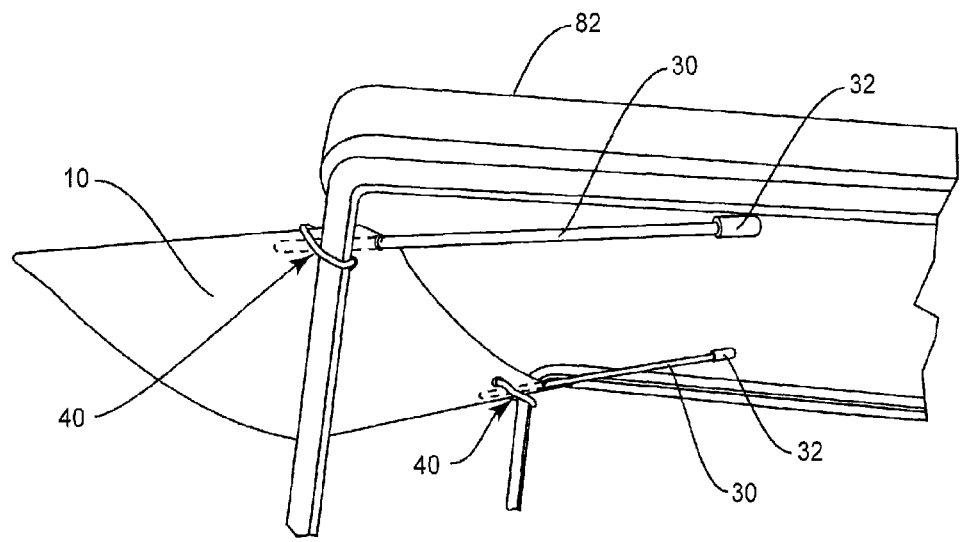
FIG. 4 is a perspective view of the attachable vehicle roof canopy showing the extension of the slidable rods.

In one embodiment, the attachable vehicle roof canopy may be used with a golf cart. The attachable golf cart canopy 10 acts as a canopy extending the area of protection from the roof of a golf cart 80. It mounts on the roof supports 84, 86, on either side of the golf cart 80 just under the roof. A more permanent solution to the problem of the golf cart 80 not giving the occupants adequate protection from rain or sun could be a attachable golf cart canopy 10 that is mounted to the top or bottom of the roof 82 or to the roof supports 84, 86, of the golf cart 80 that would swing up or down when needed for protection. Also, the attachable golf cart canopy uses slide out rod means that keeps the canopy from going vertical. In particular, the attachable golf cart canopy 10 includes slide out rod means 30 which, when extended, holds the attachable golf cart canopy in more of a horizontal position as shown in FIGS. 3 and 4. This is accomplished by sliding the slide out rod means 30 as shown that it interacts with the golf cart roof and the attachable golf cart canopy 10.

It is noted that the terms attachable vehicle roof canopy and attachable golf cart canopy may be interchangeably used herein and referenced by 10 in the drawings. In particular, the present invention is directed to an attachable vehicle roof canopy 10 comprising:
  a) an attachable vehicle roof canopy comprising a weather protective material 12 comprising sun blocking material, a bottom edge 13, a top edge 14, two side edges 15 and 16, and four corners 17, 18, 19, and 20;
  b) a slide out rod means 30 extending from the bottom edge to the top edge of the attachable vehicle roof canopy and beyond, wherein the slide out rod means may be slid out from the attachable vehicle roof canopy;
  c) at least one upper connecting means 40 for connecting the attachable vehicle roof canopy 10 to a vehicle roof such as a golf cart 80; and
  d) at least one lower connecting means 50 for connecting the attachable vehicle roof canopy 10 to a vehicle roof such as a golf cart 80.

Figure 1:
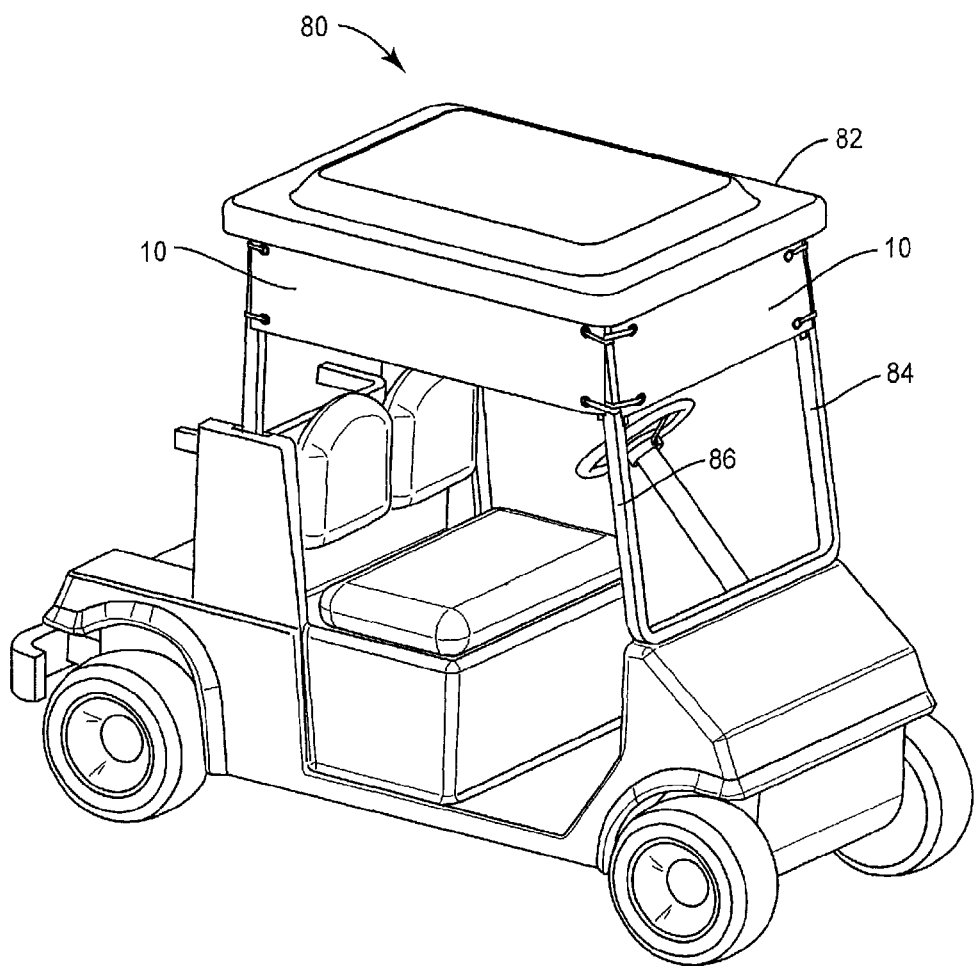
FIG. 1 is a perspective view of a front view of a golf cart and the attachable golf cart canopy in accordance with an embodiment of the present invention.

The present invention is further directed to a golf cart 80 comprising the attachable vehicle roof canopy 10 as set forth above. As shown in FIGS. 1 and 3, the golf cart 80 includes a roof 82 and a roof support 84 connecting the roof 82 to the golf cart 80.

The present invention can be further defined by including two upper connecting means 40 and two lower connecting means 50 for connecting the attachable vehicle roof canopy 10 to a vehicle roof such as a golf cart 80 wherein the two upper connecting means 50 is selected from a Velcro attachment means or other suitable attachment means.

The attachable golf cart canopy 10 may further include two lower connecting means 50 for connecting the attachable golf cart canopy 10 to the golf cart 80 wherein the two lower connecting means 50 may be a metal hook, a plastic hook, or a bungee cord. The attachable golf cart canopy 10 may further include at least one upper grommet 62 and one lower grommet 64 wherein the at least one upper connecting means 40 extends between the at least one upper grommet 62 and the golf cart 80 and the at least one lower connecting means 50 extends between the at least one lower grommet 64 and the golf cart 80.

The five figures, FIG. 1, 2A, 2B, 3 and 4, of this application show a golf cart 80 including an attachable golf cart canopy 10 comprising: an attachable golf cart canopy 10 comprising a weather protective material 12 comprising sun blocking material comprising a bottom edge 13, a top edge 14, two side edges 15 and 16, and four corners 17, 18, 19 & 20. The attachable golf cart canopy 10 further includes a slide out rod means 30 extending from the bottom edge to the top edge and beyond; at least one upper connecting means 40 for connecting the attachable golf cart canopy 10 to the golf cart 80; and at least one lower connecting means 50 for connecting the attachable golf cart canopy 10 to the golf cart 80.

The attachable golf cart canopy 10 may further include two upper connecting means 42, 44 for connecting the attachable golf canopy 10 to the golf cart 80.

The attachable golf cart canopy 10 may further include two lower connecting means 52, 54 for connecting the attachable golf canopy 10 to the golf cart 80.

The attachable golf cart canopy 10 may further include the two upper connecting means is selected from a Velcro attachment means 46.

The attachable golf cart canopy 10 may further include two lower connecting means 42, 44 for connecting the weather protective canopy to the golf cart.

The attachable golf cart canopy 10 may further include two lower connecting means which may be a metal hook, a plastic hook, or a bungee cord.

The attachable golf cart canopy 10 may further include at least one upper grommet 62 and one lower grommet 64 wherein the at least one upper connecting means extends between the at least one upper grommet 62 and the golf cart 80 and the at least one lower connecting means 50 extends between the at least one lower grommet 64 and the golf cart 80. In particular, the attachable golf cart canopy 10 may be connected to the roof supports 84, 86 of the golf cart 10.

Figure 2A:
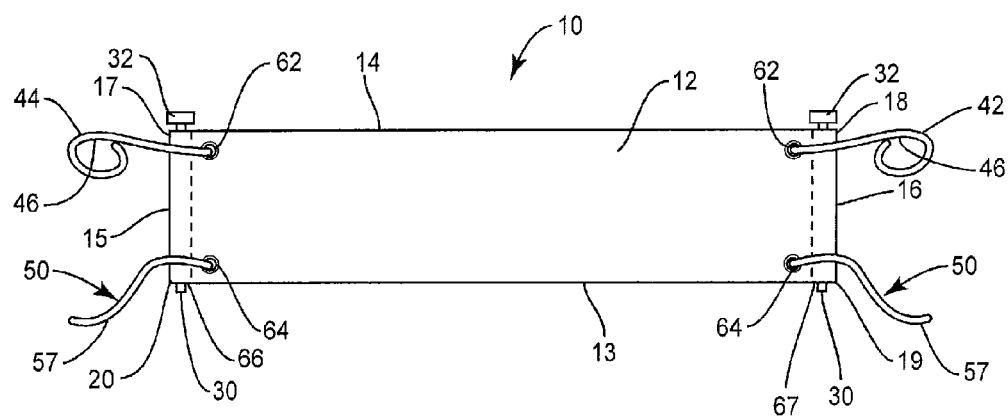
FIG. 2A is a perspective view of the attachable vehicle roof canopy.
Figure 2B:
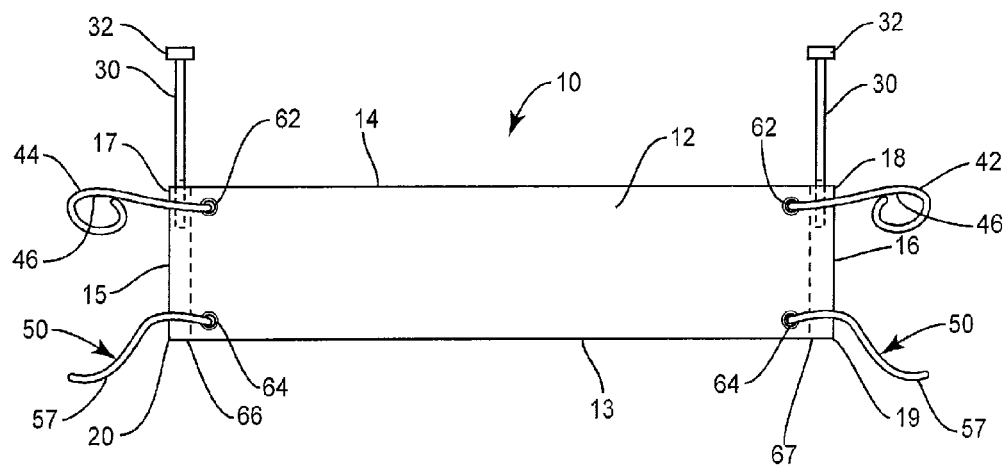
FIG. 2B is a perspective view of the attachable vehicle roof canopy.

The attachable golf cart canopy 10 may be a rectangle as shown in FIGS. 2A and 2B. The slide out rods 30 go inside a plastic pipe 66, 67, which attach to the plastic filler 68. They attach to each end 15 of the attachable golf cart canopy 10. In addition the slide out rod means 30 may further include an enlarged end 32. Two grommets 62, 64 are attached to each end 15 of the attachable golf cart canopy 10 with one grommet at each end for the bungee cord 57. The bungee cords 57 are attached to the roof supports 84, 86 of the golf cart 80 with Velcro.

The attachable golf cart canopy 10 includes weather protective material 12 comprising sun blocking material wherein the weather protective material 12 may be made from a thin sheet of flexible water-resistant or waterproof material, as for example, poly vinyl chloride, nylon, polyester, canvas or other plastic material or suitable material having the foregoing properties.

The attachable golf cart canopy 10 is attached with the bungee cords 57 to the roof supports 84, 86 of the golf cart just under the roof 82. The two slide out rods 30 inside the corresponding pipes 66, 67, are pulled out pushing against the underside of the roof 82. The two slide out rods 30 under the roof 82 prevent the attachable golf cart canopy 10 from going vertical from its weight. The bungee cords may be attached to the grommets 62, 64, on the two side edges 15 of the attachable golf cart canopy 10. The other end of the bungee cord 57 may be tied to the lower end of the roof supports 84, 86 of the golf cart 80 to prevent the wind from blowing the attachable golf cart canopy 10 upward.

Attach the plastic pipe to the plastic filler with plastic electrical ties, one for each end 15. Take the weather protective canopy at each end and fold it over the plastic filler and pipes 66, 67. Glue the weather protective canopy 10 to the plastic filler. The grommets 62, 64 are punched through the attachable golf cart canopy 10 and plastic filler. This holds the attachable golf cart canopy 10 to the plastic filler 68 and plastic pipes 66, 67 at each end 15 of the attachable golf cart canopy 10.

The two grommets 62, 64 are located near the two ends 15 of the weather protective canopy 10. The side closest to the cart the grommet 62, 64 is placed from about 1" to about 2" from the two ends 15 and 16 of the attachable golf cart canopy 10. The other side the grommet 62, 64 is placed as close to the end 15 of the attachable golf cart canopy 10 as possible. Attach bungee cords 57 to the grommets 62, 64 closest to the roof supports 84, 86 of the golf cart 80. The grommets 62, 64 are located from about 1" to about 2" from the edge 15 of the attachable golf cart canopy 10. Slide the plastic rods into the plastic pipe 66, 67 on the side 15 closest to the golf cart 80.

Other materials may be used for the weather protective canopy 10 such as vinyl, cloth, nylon etc. Other materials may be used for the bungee cord 57 and other methods of attaching the bungee cords 57 to the roof supports 84, 86 of the golf cart 80 may be used.

The golfer would have the attachable golf cart canopy 10 stored in his golf bag. If the weather changed, the golfer may quickly attach the attachable golf cart canopy 10 to the golf cart 80 and remove the attachable golf cart canopy 10 as desired.

As set forth above, the attachable vehicle roof canopy of this invention may be used with vehicles such as tractors or similar vehicles with an open roof attachment.

Notwithstanding that the numerical ranges and parameters setting forth the broad scope of the invention are approximations, the numerical values set forth in the specific examples are reported as precisely as possible. Other than in the operating examples, or where otherwise indicated, all numbers expressing quantities of ingredients, reaction conditions, and so forth used in the specification and claims are to be understood as being modified in all instances by the term "about." Any numerical value, however, inherently contain certain errors necessarily resulting from the standard deviation found in their respective testing measurements.

What is claimed is:

1. An attachable vehicle roof canopy comprising:
    a) a weather protective canopy comprising a weather protective material comprising sun blocking material, a bottom edge, a top edge, two side edges, and four corners;
    b) a slide out rod means extending from the bottom edge to the top edge;
    c) at least one upper connecting means for connecting the weather protective canopy to the vehicle roof; and
    d) at least one lower connecting means for connecting the weather protective canopy to a roof support.

2. The attachable vehicle roof canopy of claim 1 further comprising a plastic pipe for containment of the slide out rod means.

3. The attachable vehicle roof canopy of claim 1 comprising two upper connecting means for connecting the attachable vehicle roof canopy to the vehicle roof.

4. The attachable vehicle roof canopy of claim 1 comprising two lower connecting means for connecting the attachable vehicle roof canopy to the roof supports.

5. The attachable vehicle roof canopy of claim 1 wherein the two upper connecting means is selected from a Velcro attachment means.

6. The attachable vehicle roof canopy of claim 1 wherein the two lower connecting means may be a metal hook, a weather protective hook, or a bungee cord.

7. The attachable vehicle roof canopy of claim 1 wherein the weather protective material is water-resistant and includes sunblock material.

8. The attachable vehicle roof canopy of claim 1 wherein the weather protective material is selected from water-resistant poly vinyl chloride, water-resistant nylon or water-resistant polyester.

9. An attachable golf cart canopy comprising:
    e) a weather protective canopy comprising a weather protective material comprising sun blocking material, a bottom edge, a top edge, two side edges, and four corners;
    f) a slide out rod means extending from the bottom edge to the top edge;
    g) at least one upper connecting means for connecting the weather protective canopy to the golf cart; and
    h) at least one lower connecting means for connecting the weather protective canopy to the golf cart.

10. The golf cart comprising the attachable golf cart canopy of claim 9.

11. The attachable golf cart canopy of claim 9 further comprising a plastic pipe for containment of the slide out rod means.

12. The attachable golf cart canopy of claim 9 comprising two upper connecting means for connecting the attachable golf cart canopy to the golf cart.

13. The attachable golf cart canopy of claim 9 comprising two lower connecting means for connecting the attachable golf cart canopy to the golf cart.

14. The attachable golf cart canopy of claim 9 wherein the two upper connecting means is selected from a Velcro attachment means.

15. The attachable golf cart canopy of claim 9 comprising two lower connecting means for connecting the weather protective canopy to the golf cart.

16. The attachable golf cart canopy of claim 9 wherein the two lower connecting means may be a metal hook, a weather protective hook, or a bungee cord.

17. The attachable golf cart canopy of claim 9 wherein the weather protective material is water-resistant and includes sunblock material.

18. The attachable golf cart canopy of claim 9 wherein the weather protective material is selected from water-resistant poly vinyl chloride, water-resistant nylon or water-resistant polyester.

19. The attachable golf cart canopy of claim 1 wherein the canopy comprises at least one upper grommet and one lower grommet wherein the at least one upper connecting means extends between the at least one upper grommet and the golf cart and the at least one lower connecting means extends between the at least one lower grommet and the golf cart.

* * * * *